United States Patent
Van de Wiele et al.

(10) Patent No.: US 11,868,866 B2
(45) Date of Patent: Jan. 9, 2024

(54) CONTROLLING AGENTS USING AMORTIZED Q LEARNING

(71) Applicant: DeepMind Technologies Limited, London (GB)

(72) Inventors: Tom Van de Wiele, London (GB); Volodymyr Mnih, Toronto (CA); Andriy Mnih, London (GB); David Constantine Patrick Warde-Farley, Quebec (CA)

(73) Assignee: Deep Mind Technologies Limited, London (GB)

( * ) Notice: Subject to any disclaimer, the term of this patent is extended or adjusted under 35 U.S.C. 154(b) by 256 days.

(21) Appl. No.: 17/287,306

(22) PCT Filed: Nov. 18, 2019

(86) PCT No.: PCT/EP2019/081577
§ 371 (c)(1),
(2) Date: Apr. 21, 2021

(87) PCT Pub. No.: WO2020/099672
PCT Pub. Date: May 22, 2020

(65) Prior Publication Data
US 2021/0357731 A1    Nov. 18, 2021

Related U.S. Application Data

(60) Provisional application No. 62/768,788, filed on Nov. 16, 2018.

(51) Int. Cl.
*G06N 3/04* (2023.01)
*G06N 3/047* (2023.01)
(Continued)

(52) U.S. Cl.
CPC ............. *G06N 3/047* (2023.01); *G06N 3/006* (2013.01); *G06N 3/084* (2013.01)

(58) Field of Classification Search
CPC . G06N 3/02–0499; G06N 3/084; G06N 20/00
(Continued)

(56) References Cited

U.S. PATENT DOCUMENTS

2017/0140270 A1 * 5/2017 Mnih ..................... G06N 3/045
2019/0354849 A1 * 11/2019 Tran ...................... G06V 10/82

FOREIGN PATENT DOCUMENTS

WO   WO-2018156891 A1 *  8/2018   ............. G06N 3/006

OTHER PUBLICATIONS

Metz et al. "Discrete Sequential Prediction of Continuous Actions for Deep RL", May 14, 2017, arXiv:1705.05035v1.*
(Continued)

*Primary Examiner* — Jue Louie
(74) *Attorney, Agent, or Firm* — Fish & Richardson P.C.

(57) ABSTRACT

Methods, systems, and apparatus, including computer programs encoded on computer storage media, for training a neural network system used to control an agent interacting with an environment. One of the methods includes receiving a current observation; processing the current observation using a proposal neural network to generate a proposal output that defines a proposal probability distribution over a set of possible actions that can be performed by the agent to interact with the environment; sampling (i) one or more actions from the set of possible actions in accordance with the proposal probability distribution and (ii) one or more actions randomly from the set of possible actions; processing the current observation and each sampled action using a Q neural network to generate a Q value; and selecting an action using the Q values generated by the Q neural network.

33 Claims, 5 Drawing Sheets (51) Int. Cl.
   *G06N 3/006* (2023.01)
   *G06N 3/084* (2023.01)
(58) Field of Classification Search
   USPC .................................... 706/12, 15–16, 25
   See application file for complete search history.

(56) References Cited

OTHER PUBLICATIONS

Andrychowicz et al., "Hindsight experience replay," In Advances in Neural Information Processing Systems, Feb. 2018, 15 pages.
Beattie et al., "Deepmind Lab," Artificial Intelligence, arXiv preprint arXiv:1612.03801, Dec. 2016, 11 pages.
Bellemare et al., "A distributional perspective on reinforcement learning," International Conference on Machine Learning, Jul. 2017, 10 pages.
Espeholt et al., "Impala: Scalable distributed deep-rl with importance weighted actor-learner architectures," International Conference on Machine Learning, Jul. 2018, 22 pages.
Gu et al., "Continuous deep q-learning with model-based acceleration," International Conference on Machine Learning, Jun. 2016, 10 pages.
Horgan et al., "Distributed prioritized experience replay," Published as a conference paper at ICLR, arXiv preprint arXiv:1803.00933, Mar. 2018, 19 pages.
Kalashnikov et al., "Qt-opt: Scalable deep reinforcement learning for vision-based robotic manipulation," 2nd Conference on Robot Learning, arXiv preprint arXiv:1806.10293, Jun. 2018, 23 pages.
Kroese et al., "Cross-entropy method," Encyclopedia of Operations Research and Management Science, Jan. 2013, 12 pages.
Lillicrap et al., "Continuous control with deep reinforcement learning," Machine Learning, arXiv preprint arXiv:1509.02971, Sep. 2015, 14 pages.
Lim et al., "Actor-Expert: A 1-26 Framework for using Action-Value Methods in Continuous Action Spaces," Journal of Machine Learning Research, Oct. 2018, 41 pages.
Lin et al., "Reinforcement learning for robots using neural networks," Carnegie-Mellon Univ Pittsburgh PA School of Computer Science, Jan. 1993, 168 pages.
Metz et al., "Discrete sequential prediction of continuous actions for deep rl," Google Brain, arXiv preprint arXiv:1705.05035, May 2017, 26 pages.
Mnih et al., "Asynchronous methods for deep reinforcement learning," International conference on machine learning, Jun. 2016, 10 pages.
Mnih et al., "Human-level control through deep reinforcement learning," Nature, Feb. 2015, 13 pages.
PCT International Search Report and Written Opinion in International Appln. No. PCT/EP2019/081577, dated Mar. 4, 2020, 14 pages.
Quillen et al., "Deep reinforcement learning for vision-based robotic grasping: A simulated comparative evaluation of off-policy methods," 2018 IEEE International Conference on Robotics and Automation (ICRA), May 2018, 8 pages.
Schulman et al., "Trust region policy optimization," International Conference on Machine Learning, Jun. 2015, 9 pages.
Silver et al., "Deterministic policy gradient algorithms," International Conference on Machine Learning, Jan. 2014, 9 pages.
Sutton et al., "Reinforcement learning: an introduction," MIT Press, Feb. 1998, 352 pages.
Tassa et al., "Deepmind Control Suite," Artificial Intelligence, arXiv preprint arXiv:1801.00690, Jan. 2018, 24 pages.
Todorov et al., "Mujoco: A physics engine for model-based control," 2012 IEEE/RSJ International Conference on Intelligent Robots and Systems, Oct. 2012, 8 pages.
Uhlenbeck et al., "On the theory of the brownian motion," Physical Review, Sep. 1930, 19 pages.
Watkins et al., "Q-learning," Machine Learning, May 1992, 14 pages.
Wiehe et al., "Sampled policy gradient for learning to play the game agar. io.," arXiv preprint arXiv:1809.05763, Sep. 2018, 18 pages.
Williams et al., "Simple statistical gradient-following algorithms for connectionist reinforcement learning," Machine Learning, May 1992, 28 pages.

\* cited by examiner

CONTROLLING AGENTS USING AMORTIZED Q LEARNING

CROSS-REFERENCE TO RELATED APPLICATION

This application is a National Stage Application under 35 U.S.C. § 371 and claims the benefit of International Application No. PCT/EP2019/081577, filed Nov. 18, 2019, which claims priority to U.S. Application No. 62/768,788, filed Nov. 16, 2018, entitled CONTROLLING AGENTS USING AMORTIZED Q LEARNING, the disclosure of which is incorporated herein by reference.

BACKGROUND

This specification relates to reinforcement learning.

In a reinforcement learning system, an agent interacts with an environment by performing actions that are selected by the reinforcement learning system in response to receiving observations that characterize the current state of the environment.

Some reinforcement learning systems select the action to be performed by the agent in response to receiving a given observation in accordance with an output of a neural network.

Neural networks are machine learning models that employ one or more layers of nonlinear units to predict an output for a received input. Some neural networks are deep neural networks that include one or more hidden layers in addition to an output layer. The output of each hidden layer is used as input to the next layer in the network, i.e., the next hidden layer or the output layer. Each layer of the network generates an output from a received input in accordance with current values of a respective set of parameters.

SUMMARY

This specification generally describes a reinforcement learning system that controls an agent interacting with an environment.

Particular embodiments of the subject matter described in this specification can be implemented so as to realize one or more of the following advantages.

Many complex tasks, e.g., robotic tasks, require selecting an action from a large discrete action space, a continuous action space, or a hybrid action space, i.e., with some sub-actions being discrete and others being continuous. In order to apply a traditional Q-learning technique to such tasks or to select an action using a conventional Q neural network, a maximization over the set of possible actions (or a discretized version of the set of actions) needs to be repeatedly performed. In particular, this maximization is required each time that an action needs to be selected for performance by the agent and each time that an update to the Q network parameters is determined. Repeatedly performing this maximization is computationally intensive and consumes a significant amount of computational resources when the action space is large. Additionally, many Q learning techniques reduce latency by performing a single forward pass through the Q network to generate the Q values for all actions in the space. However, such approaches are infeasible when the action space is large or continuous.

By incorporating a proposal neural network and sampling from the proposal probability distributions generated by the proposal neural network, the described techniques reduce the amount of computational resources consumed by Q learning because computing a maximization over all actions is no longer required. Instead, only a relatively small number of sampled actions need to be evaluated using the Q network. In other words, the described techniques "amortize" the cost of evaluating the actions in the set of actions using the Q network. Thus, the described techniques can be used to control agents for tasks with large discrete action spaces, continuous action spaces, or hybrid action spaces with reduced latency and reduced consumption of computational resources while still maintaining effective performance.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

This specification describes a reinforcement learning system that controls an agent interacting with an environment by, at each of multiple time steps, processing data characterizing the current state of the environment at the time step (i.e., an "observation") to select an action to be performed by the agent.

At each time step, the state of the environment at the time step depends on the state of the environment at the previous time step and the action performed by the agent at the previous time step.

In some implementations, the environment is a real-world environment and the agent is a mechanical agent interacting with the real-world environment, e.g., a robot or an autonomous or semi-autonomous land, air, or sea vehicle navigating through the environment.

In these implementations, the observations may include, e.g., one or more of: images, object position data, and sensor data to capture observations as the agent interacts with the environment, for example sensor data from an image, distance, or position sensor or from an actuator.

For example in the case of a robot, the observations may include data characterizing the current state of the robot, e.g., one or more of: joint position, joint velocity, joint force, torque or acceleration, e.g., gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, and may be absolute and/or relative observations.

The observations may also include, for example, sensed electronic signals such as motor current or a temperature signal; and/or image or video data for example from a camera or a LIDAR sensor, e.g., data from sensors of the agent or data from sensors that are located separately from the agent in the environment.

In these implementations, the actions may be control inputs to control the robot, e.g., torques for the joints of the robot or higher-level control commands, or the autonomous or semi-autonomous land, air, sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Action data may additionally or alternatively include electronic control data such as motor control data, or more generally data for controlling one or more electronic devices within the environment the control of which has an effect on the observed state of the environment. For example in the case of an autonomous or semi-autonomous land or air or sea vehicle the actions may include actions to control navigation e.g. steering, and movement e.g., braking and/or acceleration of the vehicle.

In some other applications the agent may control actions in a real-world environment including items of equipment, for example in a data center, in a power/water distribution system, or in a manufacturing plant or service facility. The observations may then relate to operation of the plant or facility. For example the observations may include observations of power or water usage by equipment, or observations of power generation or distribution control, or observations of usage of a resource or of waste production. The actions may include actions controlling or imposing operating conditions on items of equipment of the plant/facility, and/or actions that result in changes to settings in the operation of the plant/facility e.g. to adjust or turn on/off components of the plant/facility.

In the case of an electronic agent the observations may include data from one or more sensors monitoring part of a plant or service facility such as current, voltage, power, temperature and other sensors and/or electronic signals representing the functioning of electronic and/or mechanical items of equipment. For example the real-world environment may be a manufacturing plant or service facility, the observations may relate to operation of the plant or facility, for example to resource usage such as power consumption, and the agent may control actions or operations in the plant/facility, for example to reduce resource usage. In some other implementations the real-world environment may be a renewal energy plant, the observations may relate to operation of the plant, for example to maximize present or future planned electrical power generation, and the agent may control actions or operations in the plant to achieve this.

As another example, the environment may be a chemical synthesis or protein folding environment such that each state is a respective state of a protein chain or of one or more intermediates or precursor chemicals and the agent is a computer system for determining how to fold the protein chain or synthesize the chemical. In this example, the actions are possible folding actions for folding the protein chain or actions for assembling precursor chemicals/intermediates and the result to be achieved may include, e.g., folding the protein so that the protein is stable and so that it achieves a particular biological function or providing a valid synthetic route for the chemical. As another example, the agent may be a mechanical agent that performs or controls the protein folding actions or chemical synthesis steps selected by the system automatically without human interaction. The observations may comprise direct or indirect observations of a state of the protein or chemical/intermediates/precursors and/or may be derived from simulation.

In some implementations the environment may be a simulated environment and the agent may be implemented as one or more computers interacting with the simulated environment.

The simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In some implementations, the simulated environment may be a simulation of a particular real-world environment. For example, the system may be used to select actions in the simulated environment during training or evaluation of the control neural network and, after training or evaluation or both are complete, may be deployed for controlling a real-world agent in the real-world environment that is simulated by the simulated environment. This can avoid unnecessary wear and tear on and damage to the real-world environment or real-world agent and can allow the control neural network to be trained and evaluated on situations that occur rarely or are difficult to re-create in the real-world environment.

Generally, in the case of a simulated environment, the observations may include simulated versions of one or more of the previously described observations or types of observations and the actions may include simulated versions of one or more of the previously described actions or types of actions.

Optionally, in any of the above implementations, the observation at any given time step may include data from a previous time step that may be beneficial in characterizing the environment, e.g., the action performed at the previous time step, the reward received at the previous time step, and so on.

Figure 1:
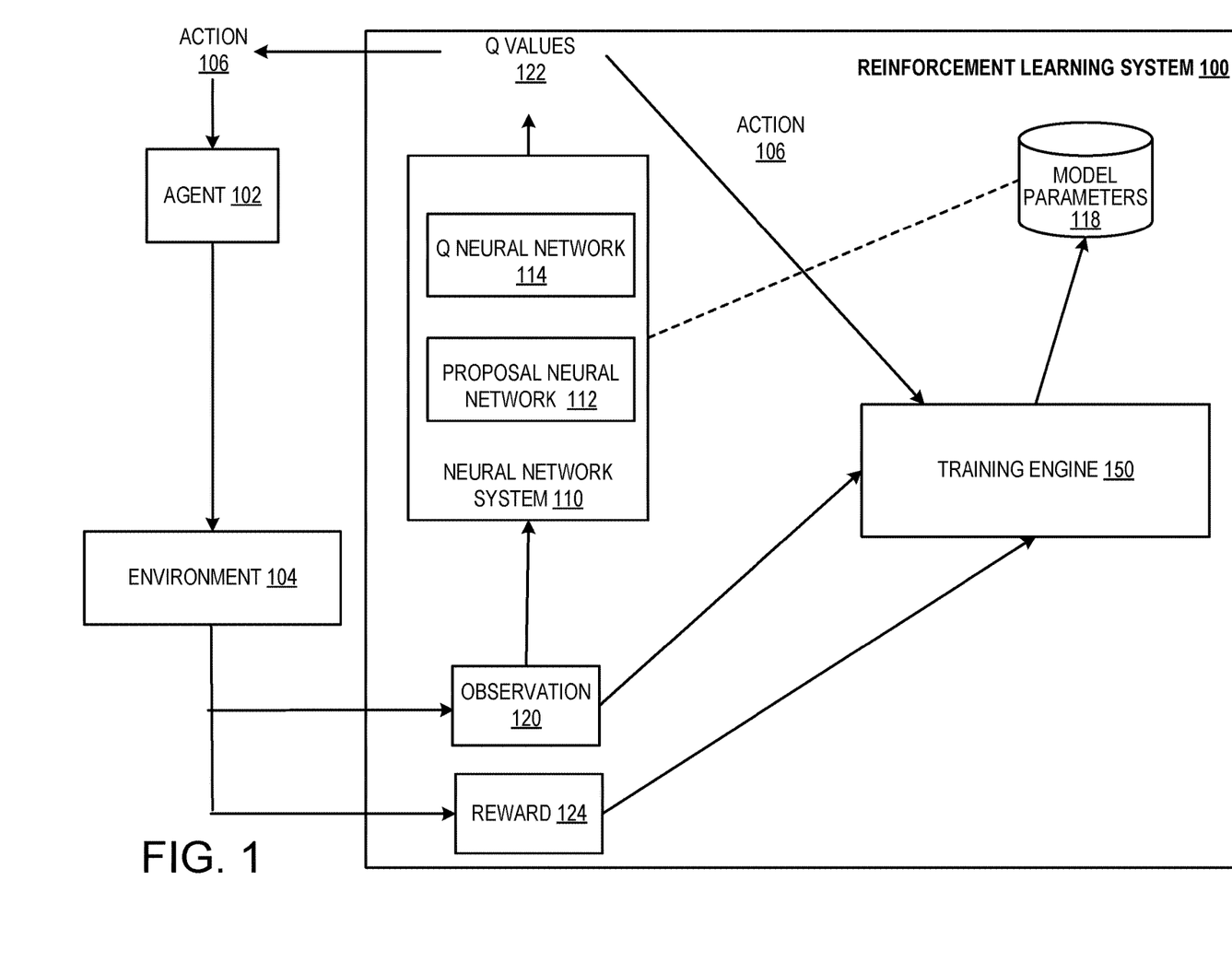
FIG. 1 shows an example reinforcement learning system.

FIG. 1 shows an example reinforcement learning system 100. The reinforcement learning system 100 is an example of a system implemented as computer programs on one or more computers in one or more locations in which the systems, components, and techniques described below are implemented.

The system 100 controls an agent 102 interacting with an environment 104 by selecting actions 106 to be performed by the agent 102 and then causing the agent 102 to perform the selected actions 106.

Performance of the selected actions 106 by the agent 102 generally causes the environment 104 to transition into new states. By repeatedly causing the agent 102 to act in the environment 104, the system 100 can control the agent 102 to complete a specified task.

The system 100 includes a neural network system 110, a training engine 150, and one or more memories storing a set of model parameters 118 of the neural networks that are included in the neural network system 110.

At each of multiple time steps, the neural network system 110 is configured to process an input that includes the current observation 120 characterizing the current state of the environment 104 in accordance with the model parameters 118 to generate a set of Q values 122 for a proper subset of the actions in a set of possible actions that can be performed by the agent 102.

The system 100 uses the Q values 122 to control the agent, i.e., to select the action 106 to be performed by the agent at the current time step in accordance with an action selection policy and then cause the agent to perform the action 106, e.g., by directly transmitting control signals to the agent or by transmitting data identifying the action 106 to a control system for the agent.

The Q value for an action is an estimate of a "return" that would result from the agent performing the action in response to the current observation 120 and thereafter selecting future actions performed by the agent 102 in accordance with the current values of the model parameters.

A return refers to a cumulative measure of "rewards" 124 received by the agent, for example, a time-discounted sum of rewards.

The agent can receive a respective reward 124 at each time step, where the reward 124 is specified by a scalar numerical value and characterizes, e.g., a progress of the agent towards completing a specified task.

The system 100 can select the action to be performed by the agent based on the Q values 122 using any of a variety of action selection policies, e.g., by selecting the action with the highest Q value or by mapping the Q values to probabilities and sampling an action in accordance with the probabilities. In some cases, the system 100 can select the action to be performed by the agent in accordance with an exploration policy. For example, the exploration policy may be an $\epsilon$-greedy exploration policy, where the system 100 selects the action with the highest Q value with probability $1-\epsilon$, and randomly, i.e., uniformly at random, selects the action from the set of actions with probability $\epsilon$. In this example, $\epsilon$ is a scalar value between 0 and 1. In other words, at each time step, either the action with the highest Q value or a random action is selected, and the parameter $\epsilon$ controls the probability that a random action will be selected at any given time step. This allows the whole of the set of possible actions to be explored.

In particular, the neural network system 110 includes a proposal neural network 112 and a Q neural network 114.

The Q neural network 114 is a neural network having a plurality of parameters (referred to as "Q network parameters.") For any given action in the set of possible actions that can be performed by the agent 102, the Q neural network 114 is configured to process the current observation 120 and the action in accordance with current values of the Q network parameters to generate a Q value for the action, i.e., an estimate of a return that would be received if the agent performed the sampled action in response to the current observation.

Conventionally, to select the action 106, the system 100 would have to process each action in the set of possible actions that can be performed by the agent 102 using the Q neural network 114 in order to generate Q values for all of the actions in the set of possible actions. When the action space is continuous, i.e., all of the action values in an individual action are selected from a continuous range of possible values, or hybrid, i.e., one or more of the action values in an individual action are selected from a continuous range of possible values, this is not feasible. When the action space is discrete but includes a large number of actions, this is not computationally efficient and consumes a large amount of computational resources to select a single action, as it can require a large number of forward passes through the Q neural network 114.

Instead, the neural network system 110 uses the proposal neural network 112 to reduce the number of actions that need to be evaluated by the Q neural network 114 while still allowing for accurate control of the agent 102, i.e., for the selection of a high quality action 106 in response to any given observation 120.

In particular, the neural network system 110 uses the proposal neural network 112 to select a proper subset of the actions in the set of possible actions and only evaluates the actions in the proper subset using the Q neural network 114. In other words, the system 100 is configured to use the proposal neural network 112 to select a subset of actions that contains fewer actions that the set of possible actions. The number of actions to be evaluated by the Q neural network is thus reduced. This, in turn, reduces the amount of computation involved in selecting an action, without a commensurate reduction in the return of the action.

At a high level, the proposal neural network 112 is a neural network having parameters (referred to as "proposal network parameters") that processes the observation 120 to generate a proposal output that defines a proposal probability distribution over the set of possible actions. The probability assigned to any given action in the proposal probability distribution can be regarded as an estimate of the action's probability of being the action that, if performed, would maximize the return.

The neural network system 112 then samples (i) one or more actions from the proposal probability distribution and (ii) one or more actions randomly from the set of possible actions, i.e., uniformly at random, to generate the proper subset of actions that will be evaluated using the Q neural network 114. Because the actions are sample from the proposal probability distribution, each action's likelihood of being selected is equal to the probability for that action in the proposal probability distribution and sampling one or more actions from the proposal probability distribution may therefore include selecting one or more actions with the highest proposal probability, i.e. the actions that are estimated to have the highest returns, more frequently than actions with lower proposal probabilities. Sampling actions randomly from the set of possible actions can allow the whole of the set of possible actions to be explored, and thus mitigates against the possibility that the parameters of the proposal neural network 112 have converged during training on a local minimum—rather than the global minimum—of the proposal loss function.

The number of actions in the proper subset is generally much smaller than the total number of actions in the set of possible actions. For example, even when the action space includes on the order of 5^21 possible actions, the system can still accurately control the agent with only 600 actions being included in the proper subset, e.g., with 100 actions being sampled from the proposal distribution and 500 being sampled randomly or 200 actions being sampled from the proposal distribution and 400 being sampled randomly.

This can allow the system 100 to control the agent 102 with reduced latency and while consuming fewer computational resources than conventional approaches.

Sampling actions using the proposal neural network is described in more detail below with reference to FIGS. 2 and 3.

The training engine 150 is configured to train the Q neural network 114 and the proposal neural network 112 by repeatedly updating the model parameters 118, i.e., the values of the proposal network parameters of the proposal neural network 112 and the Q network parameters of the Q neural network 114 based on the interactions of the agent with the environment.

In particular, the training engine 150 trains the Q neural network 114 and the proposal neural network 112 through reinforcement learning and, more specifically, Q learning. By making use of the proposal neural network 112 during the training of the Q neural network 114, both for generating training data through controlling the agent and for determining parameter value updates, the training engine 150 reduces the amount of computational resources consumed by the training process relative to conventional Q learning.

In some cases, the system 100 uses a distributed framework during training in which multiple agents interact with different replicas of the same environment.

Training the neural networks 112 and 114 will be described in more detail below with reference to FIGS. 4 and 5.

Figure 2:
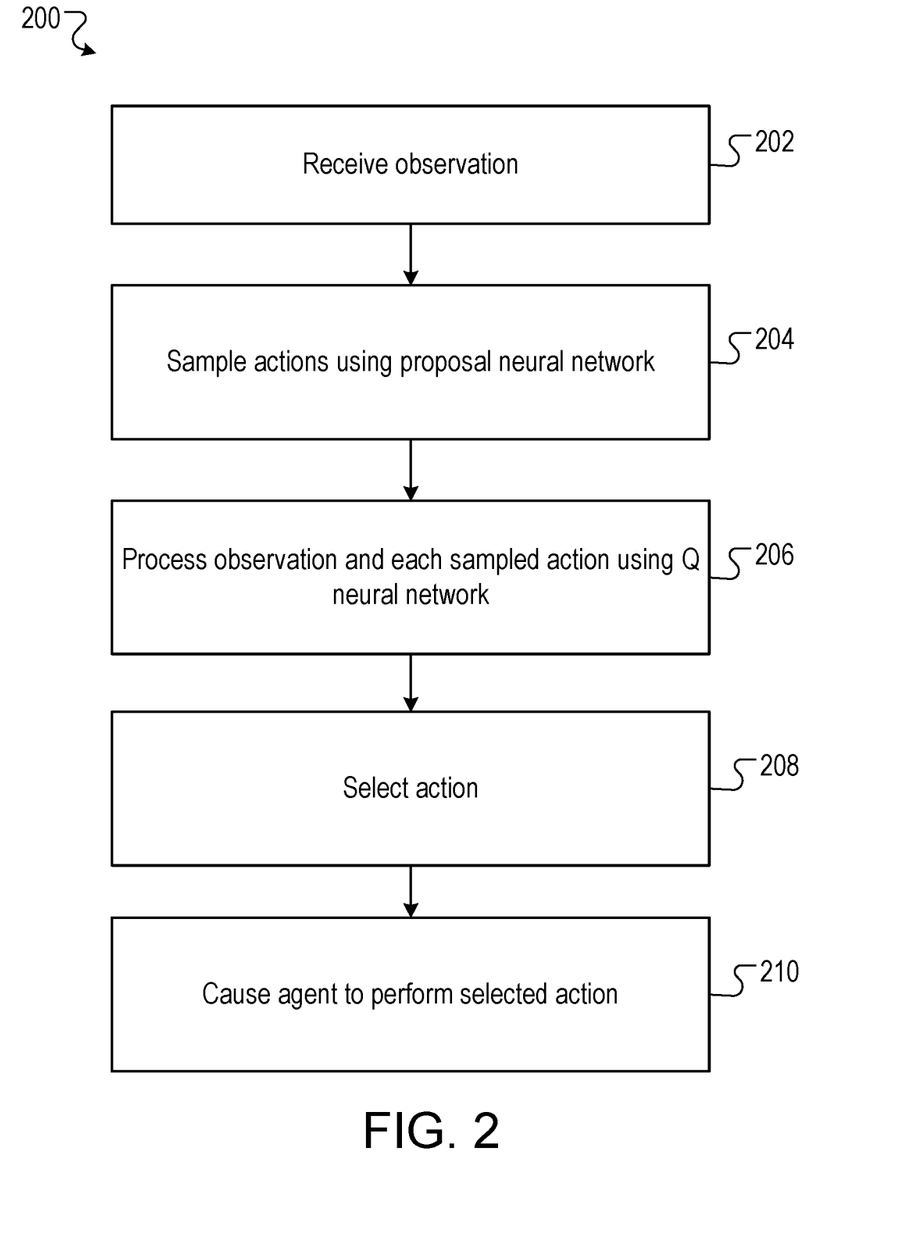
FIG. 2 is a flow diagram of an example process for controlling an agent.

FIG. 2 is a flow diagram of an example process 200 for controlling the agent. For convenience, the process 200 will be described as being performed by a system of one or more computers located in one or more locations. For example, a reinforcement learning system, e.g., the reinforcement learning system 100 of FIG. 1, appropriately programmed, can perform the process 200.

The system receives an observation characterizing the state of the environment at the current time step (step 202). As described above, in some cases the observation can also include information derived from the previous time step, e.g., the previous action performed, the reward received at the previous time step, or both.

The system samples a subset of the actions in the space of actions using the proposal neural network (step 204). In particular, the system generates the subset by sampling one or more actions using the proposal neural network and one or more actions randomly from the set of possible actions, i.e., randomly from a uniform distribution over the set of possible actions. The number of actions sampled using the proposal neural network and the number of actions sampled randomly are fixed and can be the same number of actions or different numbers of actions. Generally, however, the total number of actions is a small fraction of the total number of actions in the set of possible actions.

In some implementations, the proposal neural network generates proposal distributions that directly assign a respective probability to each of the actions in the set of possible actions, i.e., the system can generate the proposal probability distribution in a single forward pass through the proposal neural network. In these implementations, the system generates the proposal probability distribution by processing the observation through the proposal neural network in accordance with current values of the proposal network parameters to generate a proposal output that defines a probability distribution over the set of possible actions. The system can then sample one or more actions from the proposal probability distribution generated by the proposal neural network.

In these implementations, when the set of possible actions is discrete, the proposal output generally includes a respective probability for each action in the set of possible actions.

When the set of possible actions is continuous, the proposal output can include a respective probability for each choice in a discrete set of choices representing uniformly-spaced values from the range.

Alternatively, when the set of possible actions is continuous, the proposal output can include distribution parameters that define the proposal probability distribution over the continuous set of actions. That is, the proposal output can parametrize a probability distribution over the continuous set of actions.

In some other implementations, the proposal distributions generated by the proposal neural network are auto-regressive with respect to the various sub-actions that make up a given action. For example, when the actions are control inputs for a robot, any individual action may be made up of multiple sub-actions, with each sub-action corresponding to a torque to be applied to a different joint of the robot. Thus, in these cases, the system samples an action from the proposal distribution by, for each sub-action, sampling from an individual distribution for the sub-action that is conditioned on any sub-actions that have already been sampled. In these cases, the probability in the proposal distribution for a given action can be considered to be the product of the probabilities for the sub-actions in the given action in the corresponding individual auto-regressive probability distributions.

In particular, in these implementations, the system samples actions from the proposal distribution ("proposal actions") by sampling sub-action values auto-regressively one after the other according to an ordering of the sub-actions.

For each sub-action within a given proposal action, the system processes (i) the current observation and (ii) sampled action values for any sub-actions before the particular sub-action in the ordering using the proposal neural network in accordance with current values of the proposal network parameters to generate a proposal output for the sub-action that defines a sub-action probability distribution over a set of possible action values for the sub-action. The system then samples the action value for the proposal action from the sub-action probability distribution for the sub-action.

Depending on the implementation, any given sub-action can either be discrete or continuous. A sub-action is discrete when the set of possible action values for the sub-action is discrete, i.e., includes a fixed finite set of values. A sub-action is continuous when the action value for the sub-action is selected from a continuous range of action values.

When the set of possible action values for a sub-action is discrete, the proposal output includes a respective probability for each action value in the set of possible action values.

When the set of possible action values for the sub-action is a continuous set of action values selected from a continuous range of action values, the proposal output can either (i) include a respective probability for each choice in a discrete set of choices representing uniformly-spaced values from the range or (ii) include distribution parameters that define the proposal probability distribution over the continuous set of action values.

In either of the implementations, i.e., auto-regressive over sub-actions or not, the proposal probability distribution may be structured such that the system does not sample each proposed action independently, but instead conditions its sampling on one or more previously proposed actions (and the Q-values they were found to have after evaluation by the Q neural network) in a sequential fashion, for example using a recurrent neural network or a self-attention neural network as the proposal neural network to allow the proposal neural network to keep track of which actions were already sampled and what the Q values were for those actions. In other words, the system could generate respective probability distributions for each action that needs to be sampled, with the probability distribution for any given action being conditioned on any actions that have already been sampled and, optionally, the Q values for those actions.

The system processes the observation and each sampled action using the Q neural network in accordance with current values of the Q network parameters to generate a respective Q value for each sampled action (step 206). That is, the system evaluates only the relatively small number of actions in the proper subset of sampled actions using the Q network instead of needing to evaluate all of the actions in the space of possible actions.

The system selects an action using the Q values (step 208). In some cases, the system selects the sampled action with the highest Q value. In some other cases, the system selects the sampled action with the highest Q value with probability 1−ε and selects an action randomly from the entire set of actions with probability ε.

The system causes the agent to perform the selected action (step 210), i.e., by instructing the agent to perform the action or passing a control signal to a control system for the agent.

Figure 3:
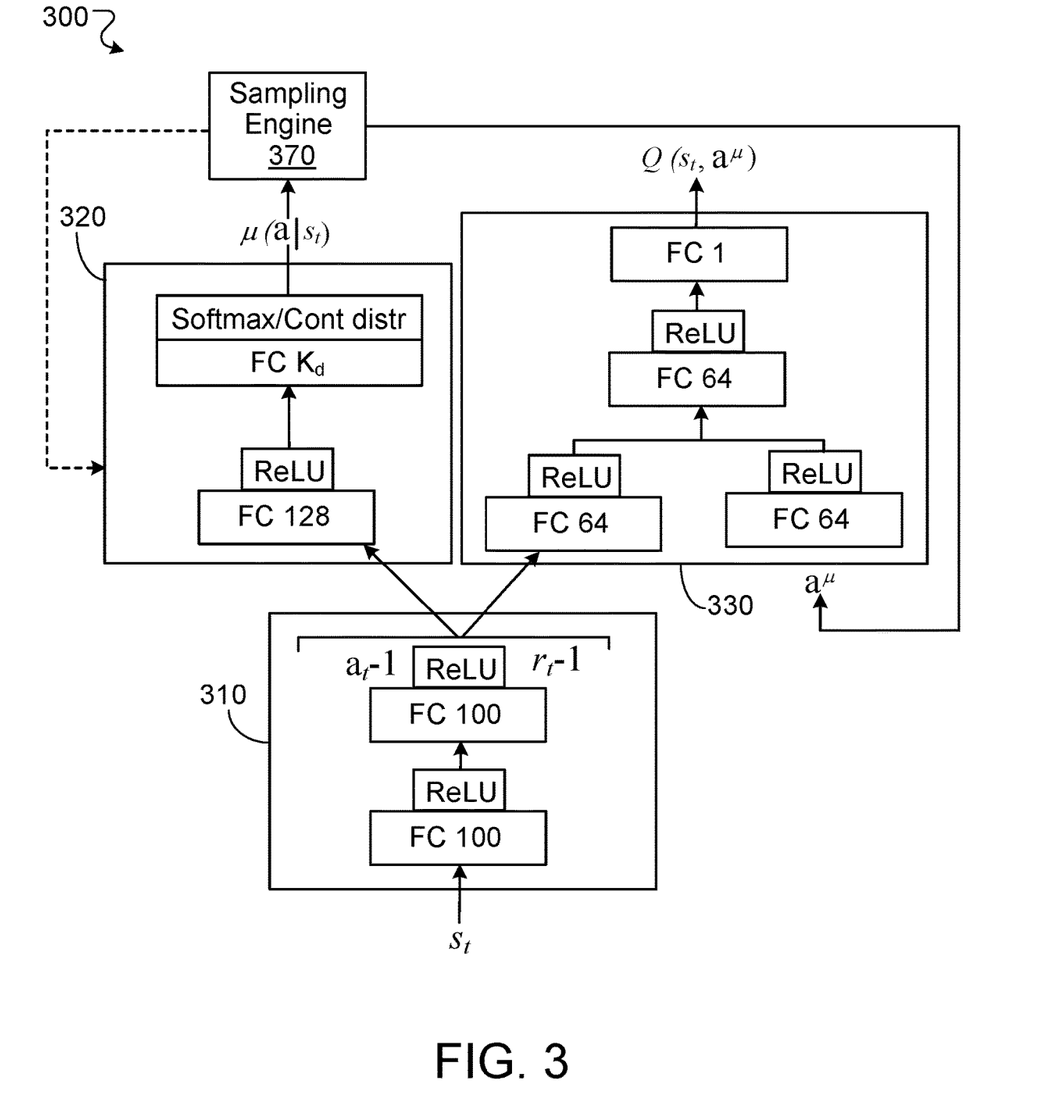
FIG. 3 shows an example architecture for the proposal neural network and the Q neural network.

FIG. 3 shows an example architecture 300 for the proposal neural network 112 and the Q neural network 114.

In the example architecture 300, the proposal neural network 112 and the Q neural network 114 share some parameters while having other parameters that are not shared, i.e., certain components are included in both the proposal neural network 112 and the Q neural network 114, while other components are specific to the proposal neural network 112 and still other components are specific to the Q neural network 114.

In particular, the example architecture 300 includes a state embedding neural network 310, a proposal neural network head 320, and a Q network head 330. The proposal neural network 112 is made up of the state embedding neural network 210 and the proposal neural network head 320, while the Q neural network is made up of the state embedding neural network 310 and the Q network head 330. Thus, the state embedding neural network 310 (and the parameters of the state embedding neural network 310) is shared between the neural networks 112 and 114. This can reduce memory requirements and reduce the computational resources required during training.

In the example architecture 300, the observation at time step t includes state data $s_t$ and data from the previous time step t−1, i.e., the action $a_{t-1}$ performed at the previous time step and the reward $r_{t-1}$ received at the previous time step.

The state embedding neural network 310 processes the state data $s_t$ to generate a state embedding and the output of the state embedding neural network 310 is concatenated with the action $a_{t-1}$ performed at the previous time step and the reward $r_{t-1}$ received at the previous time step to generate a concatenated output.

In the example of FIG. 3, the state embedding network 310 is a 2-layer multi-layer perceptron (MLP) that includes two layers, with each being a fully-connected layer with 100 units ("FC 100") that has a rectified linear unit ("ReLU") activation function. In other examples, the state embedding neural network 310 may have a different architecture, e.g., may include convolutional layers, recurrent layers, or both in place of or in addition to the fully-connected layers.

The concatenated output is then provided to both the proposal head 320 and the Q network head 330.

The proposal head 320 includes an initial fully-connected layer with 128 units ("128 FC") and a ReLU activation function.

In some implementations, the proposal neural network 112 generates proposal distributions that directly assign a respective probability to each of the actions in the set of possible actions, i.e., the proposal neural network generates the proposal output that defines the proposal probability distribution in a single forward pass. In these implementations, the proposal neural network 112 includes a single proposal output layer, e.g., a softmax output layer when the action space is discrete or a linear layer that generates parameters of a continuous distribution when the action space is continuous, that generates the proposal output that defines the probability distribution $\mu(a|s_t)$ by processing the output of the initial fully-connected neural network layer in the proposal head 320.

A sampling engine 370 can then sample one or more actions from the proposal probability distribution $\mu(a|s_t)$ defined by the proposal neural network and also sample one or more actions uniformly from the set of possible actions.

In some other implementations, the proposal distributions generated by the proposal neural network 112 are auto-regressive with respect to the various sub-actions that make up a given action. For example, when the actions are control inputs for a robot, any individual action may be made up of multiple sub-actions, with each sub-action corresponding to a torque to be applied to a different joint of the robot. As another example, when the actions are control inputs for an industrial facility, any individual action may be made of multiple sub-actions, with each sub-action corresponding to a different setting, e.g., a setting for a different component of the industrial facility.

In these cases, the proposal head 320 includes a respective proposal output layer for each sub-action d that makes up an individual action. In particular, the proposal output layer for sub-action d is an output layer of dimension $K_d$, i.e., an output layer with $K_d$ units, where $K_d$ represents the number of choices for sub-action d for discrete sub-actions and the number of distribution parameters required to parameterize a distribution over possible values for the sub-action d for continuous sub-actions.

To sample an action using the proposal neural network, the proposal engine 370 samples sub-action values auto-regressively one after the other according to an ordering of the sub-actions.

For each sub-action d within a given proposal action, the proposal head 320 processes (i) the output of the initial fully-connected layer and (ii) sampled action values for any sub-actions before the particular sub-action d in the ordering using the proposal output layer for the sub-action d in accordance with current values of the parameters of the proposal output layer to generate a proposal output for the sub-action that defines a sub-action probability distribution over a set of possible action values for the sub-action. The sampling engine 370 then samples the action value for the proposal action from the sub-action probability distribution for the sub-action. Thus, by auto-regressively sampling an action value for each sub-action, the sampling engine 370 samples an entire action from the overall probability distribution $\mu(a|s_t)$. The probability assigned to any one action by the probability distribution $\mu(a|s_t)$ is then equal to the product of the probabilities assigned to the action values for the sub-actions in the corresponding sub-action probability distributions.

The Q network head 330 receives as input (i) the concatenated output of the state embedding neural network 310 and (ii) a sampled action $a^\mu$ i.e., an action that was sampled by the sampling engine 370 either from a proposal probability distribution or uniformly from the set of possible actions and processes the input to generate a Q value $Q(s_t, a^\mu)$ for the sampled action $a^\mu$ that represents an estimated return that would be received if the agent performs the sampled action $a^\mu$ in response to the observation.

In the example architecture 300, the proposal neural network head 330 includes one fully connected layer with 64 units that processes the concatenated output and another fully-connected layer with 64 units that processes the sampled action. The outputs of these two fully-connected layers are then concatenated and processed through two final fully-connected layers, one with 64 units and one with 1 unit, to generate the Q value.

While this specification describes neural networks processing "actions," this should be understood to mean that the neural network processes a representation of an action, e.g., an identifier or an embedding of the action. Similarly, while this specification describes neural networks processing "rewards," in some cases the neural network can process an embedding of the reward instead of the actual reward value.

Figure 4:
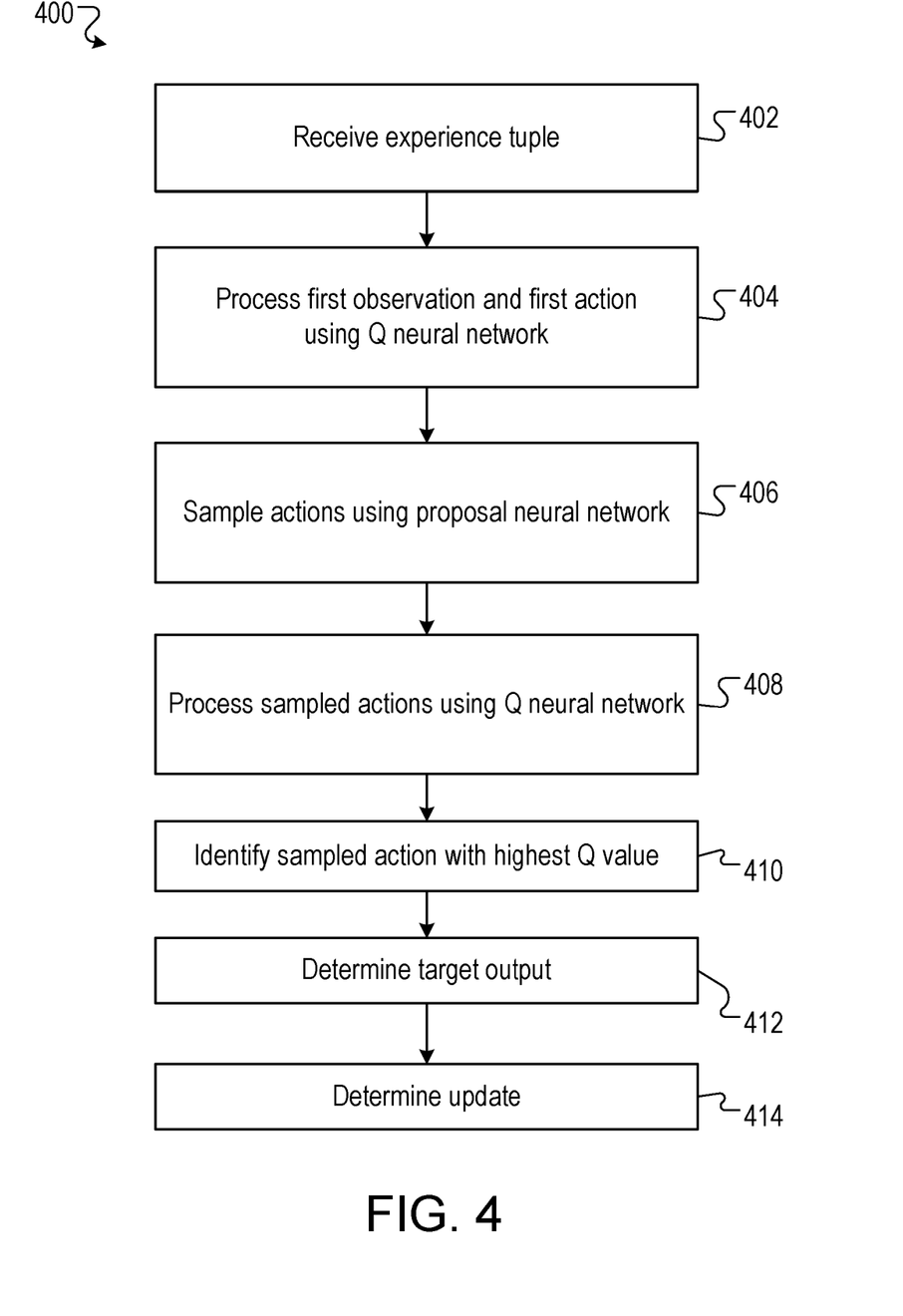
FIG. 4 is a flow diagram of an example process for updating the parameters of the Q neural network.

FIG. 4 is a flow diagram of an example process 400 for updating the parameter values of the Q neural network. For convenience, the process 400 will be described as being performed by a system of one or more computers located in one or more locations. For example, a reinforcement learning system, e.g., the reinforcement learning system 100 of FIG. 1, appropriately programmed, can perform the process 400.

The system can repeatedly perform the process 400 to train the Q neural network and the proposal neural network.

In some cases, the system distributes the training across multiple computing units.

For example, multiple independent computing units within the system can repeatedly and independently perform the process 400 to compute updates to the values of the Q neural network and the proposal neural network and then periodically use the computed updates to update a shared set of parameter values.

As another example, a single computing unit can repeatedly perform the process 400 on experience tuples received from different computing units that generate the experience tuples, i.e., by controlling respective agents using the process 200 above. The single computing unit can then periodically update the values of the Q neural network and the proposal neural network and send the updated parameter values to the different computing units.

The system receives an experience tuple (step 402). For example, the system can sample the experience tuple from a buffer memory that accessible to the system. The experience tuple includes (i) a first observation characterizing a first state of an environment being interacted with by the agent, (ii) a first action that was performed by the agent in response to the first observation, (iii), a reward and (iv) a second observation characterizing a subsequent state of the environment, i.e., the state that the environment transitioned into as a result of the agent performing the first action.

The system processes the first observation and the first action using the Q neural network and in accordance with current values of the Q network parameters to generate a Q value for the first action (step 404).

The system samples, for the second observation, a subset of the actions in the space of actions using the proposal neural network and in accordance with current values of the proposal network parameters (step 406). That is, the system selects candidate actions to be processed using the Q neural network in combination with the second observation as described above with reference to step 204.

The system processes the second observation and each sampled action using the Q neural network to generate a respective Q value for each sampled action in accordance with current values of the Q network parameters (step 408). As above, because the sampled actions are a small subset of the total number of actions in the set of actions, processing only the sampled subset using the Q neural network consumes many fewer computational resources when the space of actions is large, i.e., is continuous or includes a large number of discrete actions.

In some cases, a target Q network is used instead of the Q network to process the sampled actions. The target Q network is a neural network that has the same architecture as the Q neural network but with parameter values that are constrained to change more slowly than the parameters of the Q network during training. For example, the parameters of the target Q network can be updated to match the parameters of the Q network after a threshold number of training iterations have been performed.

The system identifies the sampled action that has the highest Q value of any of the sampled actions (step 410).

The system determines a target output (step 412). Generally, the target output is the Q value that the system determines should have been generated by the Q neural network by processing the first observation and the first action.

The system generates the target output based on the reward in the experience tuple and the sampled action that has the highest Q value of any of the sampled actions (referred to as the "argmax" sampled action).

In some implementations, the system directly uses the highest Q value generated by the neural network for any of the sampled actions and computes the target reward as the sum of the reward and the product of a discount factor, i.e., a constant scalar value between zero and one, and the highest Q value.

In some other implementations, the system evaluates the argmax sampled action using the target Q network, i.e., by processing the second observation and the argmax sampled action using the target Q network to generate a target Q value for the argmax sampled action. In these implementations, the system computes the target reward as the sum of the reward and the product of the discount factor and the target Q value for the argmax sampled action that was generated by the target Q network.

The system determines a gradient of an error between the target output and the Q value for the first action with respect to the Q network parameters and determines, from the gradient, an update to the current values of the Q network parameters (step 414). For example, the error can be a mean squared error and the system can determine the gradient through backpropagation. The system can then determine the update by applying an update rule to gradient, e.g., a stochastic gradient descent update rule, an Adam optimizer update rule, an rmsProp update rule, or a learned update rule that is specific to the training of the Q neural network.

Figure 5:
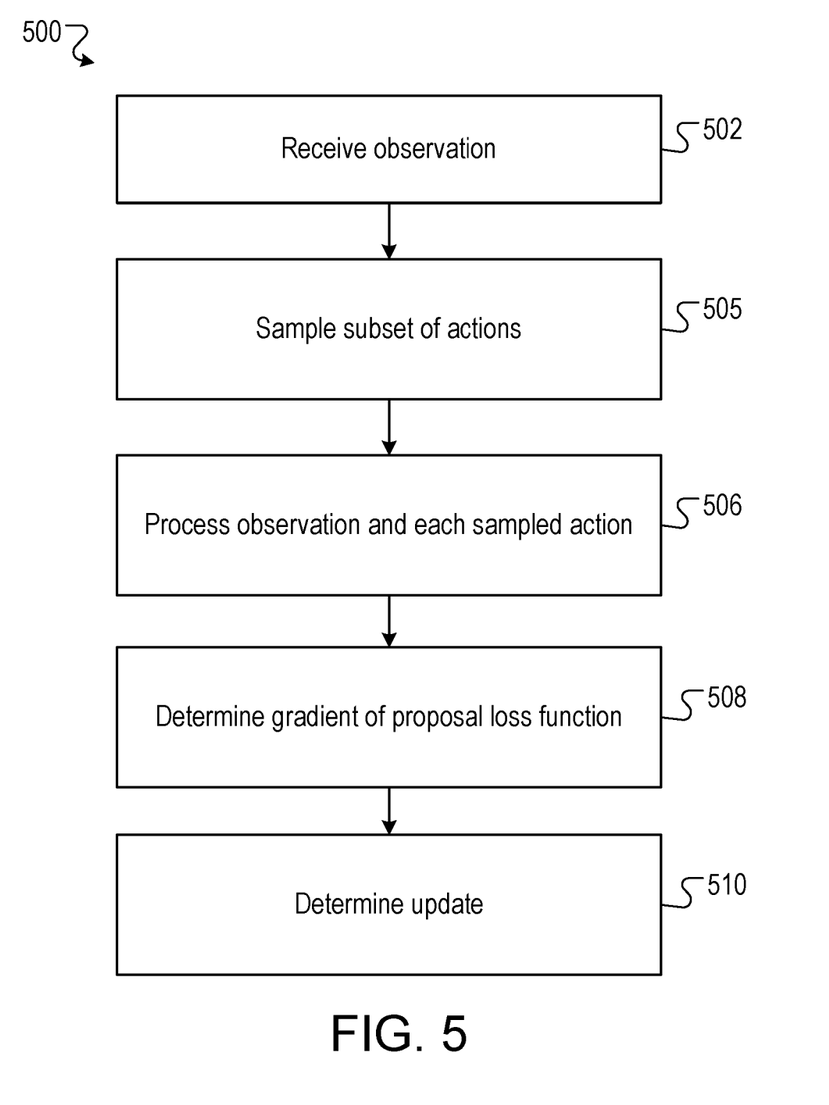
FIG. 5 is a flow diagram of an example process for updating the parameters of the proposal neural network.

FIG. 5 is a flow diagram of an example process 500 for updating the parameter values of the proposal neural network. For convenience, the process 500 will be described as being performed by a system of one or more computers located in one or more locations. For example, a reinforcement learning system, e.g., the reinforcement learning system 100 of FIG. 1, appropriately programmed, can perform the process 500.

The system can repeatedly perform the process 500 to train the proposal neural network jointly with the Q neural network. In some cases, the system jointly performs iterations of both the process 400 and the process 500 on the same experience tuples. In other cases, the system performs the process 500 independently from performing the process 400.

The system receives an observation (step 502). As described above, in some cases the observation is an observation that is in an experience tuple being used to train the Q neural network. In some other cases, the system independently samples the observation from the observations in the replay memory that is accessible by the system. In yet other cases, the system performs the process 500 on-line and the observation is one that was recently received by the system while controlling the agent.

The system samples a subset of the actions in the space of actions using the proposal neural network (step 504) as described above with reference to step 204.

The system processes the observation and each sampled action using the Q neural network to generate a respective Q value for each sampled action (step 506).

The system determines, e.g., through backpropagation, a gradient of a proposal loss function with respect to the proposal network parameters (step 508).

The proposal loss function includes a first term that encourages actions with higher Q values to be sampled more frequently.

For example, the first term can be a term that encourages the probability assigned to the sampled action having the highest Q value to be increased in the proposal probability distribution. In other words, the first term is more negative when the probability assigned to the sampled action having the highest Q value is lower than when the probability is relatively higher. As a particular example, the first term can be the negative log likelihood for the proposal probability distribution with the sampled action having the highest Q value as a target, i.e., the first term is the negative of the logarithm of the probability assigned to the sampled action having the highest Q value in the proposal distribution.

As another example, the first term can be a reinforcement learning loss, e.g., a REINFORCE loss or another loss that is optimized through reinforcement learning, with the Q-values assigned to the sampled actions by the Q network serving the role of the rewards in this secondary problem.

In some implementations, the proposal loss function also includes a second term that encourages uncertainty in the proposal probability distribution. This can help prevent the proposal probability distributions generated by the proposal neural network from collapsing to a point distribution, i.e., a probability distribution that is heavily weighted toward a single action in the set. As a particular example, the second term can be a negative entropy of the proposal probability distribution.

For example, the proposal loss function can be a weighted sum of the first term and the second term.

The system determines, from the gradient of the proposal loss function, an update to the current values of the proposal network parameters (step 510). The system can determine the update by applying an update rule to gradient, e.g., a stochastic gradient descent update rule, an Adam optimizer update rule, an rmsProp update rule, or a learned update rule that is specific to the training of the proposal neural network.

In addition to the embodiments of the attached claims and the embodiments described above, the following numbered embodiments are also innovative:

Embodiment 1 is a method, the method comprising: obtaining (i) a first observation characterizing a first state of an environment being interacted with by an agent, (ii) a first action that was performed by the agent in response to the first observation, (iii), a reward and (iv) a second observation characterizing a subsequent state of the environment; processing the first observation and the first action using a Q neural network having a plurality of Q network parameters, wherein the Q neural network is configured to process the first observation and the first action in accordance with current values of the Q network parameters to generate a Q value for the first action that is an estimate of a return that would be received if the agent performed the first action in response to the first observation; processing the second observation using a proposal neural network having a plurality of proposal network parameters, wherein the proposal neural network is configured to process the second observation in accordance with current values of the proposal network parameters to generate a proposal output that defines a proposal probability distribution over a set of possible actions that can be performed by the agent to interact with the environment; sampling (i) one or more actions from the set of possible actions in accordance with the proposal probability distribution and (ii) one or more actions randomly from the set of possible actions; processing the second observation and each sampled action using the Q neural network having a plurality of Q network parameters to generate a Q value for the sampled action that is an estimate of a return that would be received if the agent performed the sampled action in response to the second observation; generating, from the reward and the highest Q value for any of the sampled actions, a target output; determining a gradient of an error between the target output and the Q value for the first action with respect to the Q network parameters; and determining, from the gradient, an update to the current values of the Q network parameters.

Embodiment 2 is a method, the method comprising: obtaining (i) a first observation characterizing a first state of an environment being interacted with by an agent, (ii) a first action that was performed by the agent in response to the first observation, (iii), a reward and (iv) a second observation characterizing a subsequent state of the environment; processing the first observation and the first action using a Q neural network having a plurality of Q network parameters, wherein the Q neural network is configured to process the first observation and the first action in accordance with current values of the Q network parameters to generate a Q value for the first action that is an estimate of a return that would be received if the agent performed the first action in response to the first observation; sampling a plurality of actions from a set of possible actions that can be performed by the agent to interact with the environment, wherein each action in the set of possible actions comprises a respective action value for each of a plurality of sub-actions, the sampling comprising: sampling one or more random actions randomly from the set of possible actions; sampling one or more proposal actions, comprising, for each proposal action: sampling action values for the proposal action auto-regressively one after the other according to an ordering of the sub-actions, comprising, for each sub-action: processing (i) the second observation and (ii) sampled action values for any sub-actions before the particular sub-action in the ordering using a proposal neural network having a plurality of proposal network parameters, wherein the proposal neural network is configured to process (i) the second observation and (ii) the sampled action values in accordance with current values of the proposal network parameters to generate a proposal output for the sub-action that defines a sub-action probability distribution over a set of possible action values for the sub-action, and sampling the action value for the proposal action from the sub-action probability distribution for the sub-action; processing the second observation and each sampled action using the Q neural network having a plurality of Q network parameters to generate a Q value for the sampled action that is an estimate of a return that would be received if the agent performed the sampled action in response to the second observation; generating, from the reward and the highest Q value for any of the sampled actions, a target output; determining a gradient of an error between the target output and the Q value for the first action with respect to the Q network parameters; and determining, from the gradient, an update to the current values of the Q network parameters.

Embodiment 3 is the method of any one of embodiments 1 or 2, further comprising determining an update to the current values of the proposal parameters by performing operations comprising determining a gradient of a proposal loss function with respect to the proposal network parameters, wherein the proposal loss function includes a first term that encourages the probability assigned to the sampled action having the highest Q value to be increased in the proposal probability distribution; and determining, from the gradient of the proposal loss function, an update to the current values of the proposal network parameters.

Embodiment 4 is the method of embodiment 3, wherein the first term is a negative log likelihood for the proposal probability distribution with the sampled action having the highest Q value as a target.

Embodiment 5 is the method of embodiment 3 or 4, wherein the proposal loss function includes a second term that encourages uncertainty in the proposal probability distribution.

Embodiment 6 is the method of embodiment 5, wherein the second term is a negative entropy of the proposal probability distribution.

Embodiment 7 is a system comprising: one or more computers and one or more storage devices storing instructions that are operable, when executed by the one or more computers, to cause the one or more computers to perform the method of any one of embodiments 1 to 6.

Embodiment 8 is a computer storage medium encoded with a computer program, the program comprising instructions that are operable, when executed by data processing apparatus, to cause the data processing apparatus to perform the method of any one of embodiments 1 to 6.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub programs, or portions of code. A computer program can be deployed to be executed on one computer or on multiple computers that are located at one site or distributed across multiple sites and interconnected by a data communication network.

In this specification, the term "database" is used broadly to refer to any collection of data: the data does not need to be structured in any particular way, or structured at all, and it can be stored on storage devices in one or more locations. Thus, for example, the index database can include multiple collections of data, each of which may be organized and accessed differently.

Similarly, in this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read only memory or a random access memory or both. The elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework, a Microsoft Cognitive Toolkit framework, an Apache Singa framework, or an Apache MXNet framework.

Embodiments of the subject matter described in this specification can be implemented in a computing system that includes a back end component, e.g., as a data server, or that includes a middleware component, e.g., an application server, or that includes a front end component, e.g., a client computer having a graphical user interface, a web browser, or an app through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   receiving a current observation characterizing a current state of an environment being interacted with by an agent;
   sampling a plurality of actions from a set of possible actions that can be performed by the agent to interact with the environment, and wherein each action in the set of possible actions comprises a respective action value for each of a plurality of sub-actions, the sampling comprising:
   sampling one or more random actions randomly from the set of possible actions;
   sampling one or more proposal actions, comprising, for each proposal action:

sampling action values for the proposal action autoregressively one after the other according to an ordering of the sub-actions, comprising, for each sub-action:
processing (i) the current observation and (ii) sampled action values for any sub-actions before the particular sub-action in the ordering using a proposal neural network having a plurality of proposal network parameters, wherein the proposal neural network is configured to process (i) the current observation and (ii) the sampled action values in accordance with current values of the proposal network parameters to generate a proposal output for the sub-action that defines a sub-action probability distribution over a set of possible action values for the sub-action, and
sampling the action value for the proposal action from the sub-action probability distribution for the sub-action;
processing the current observation and each sampled random and proposal action using a Q neural network having a plurality of Q network parameters, wherein, for each sampled action, the Q neural network is configured to process the current observation and the sampled action in accordance with current values of the Q network parameters to generate a Q value for the sampled action that is an estimate of a return that would be received if the agent performed the sampled action in response to the current observation;
selecting an action using the Q values generated by the Q neural network for the sampled actions; and
causing the agent to perform the selected action.

2. The method of claim 1, wherein selecting an action using the Q values generated by the Q neural network comprises:
selecting the sampled action that has the highest Q value.

3. The method of claim 1, wherein selecting an action from the sampled actions using the Q values generated by the Q neural network comprises:
selecting the sampled action that has the highest Q value with probability ε; and
selecting a random action from the set of possible actions with probability 1−ε.

4. The method of claim 1, further comprising:
determining a gradient of a proposal loss function with respect to the proposal network parameters, wherein the proposal loss function includes a first term that encourages the probability assigned to the sampled action having the highest Q value to be increased in the proposal probability distribution for the sampled action having the highest Q value; and
determining, from the gradient of the proposal loss function, an update to the current values of the proposal network parameters.

5. The method of claim 4, wherein the first term is a negative log likelihood for the proposal probability distribution with the sampled action having the highest Q value as a target.

6. The method of claim 4, wherein the proposal loss function includes a second term that encourages uncertainty in the proposal probability distribution.

7. The method of claim 6, wherein the second term is a negative entropy of the proposal probability distribution.

8. The method of claim 1, wherein the proposal neural network and the Q neural network share some parameters.

9. The method of claim 1, wherein the set of possible action values for the sub-action is discrete, and wherein the proposal output includes a respective probability for each action value in the set of possible action values.

10. The method of claim 1, wherein the set of possible action values for the sub-action is a continuous set of action values selected from a range of action values, and wherein the proposal output includes a respective probability for each choice in a discrete set of choices representing uniformly-spaced values from the range.

11. The method of claim 1, wherein the set of possible action values for the sub-action is a continuous set of action values, and wherein the proposal output includes distribution parameters that define the proposal probability distribution over the continuous set of action values.

12. A system comprising:
one or more computers; and
one or more storage devices communicatively coupled to the one or more computers, wherein the one or more storage devices store instructions that, when executed by the one or more computers, cause the one or more computers to perform operations comprising:
receiving a current observation characterizing a current state of an environment being interacted with by an agent;
sampling a plurality of actions from a set of possible actions that can be performed by the agent to interact with the environment, and wherein each action in the set of possible actions comprises a respective action value for each of a plurality of sub-actions, the sampling comprising:
sampling one or more random actions randomly from the set of possible actions;
sampling one or more proposal actions, comprising, for each proposal action:
sampling action values for the proposal action autoregressively one after the other according to an ordering of the sub-actions, comprising, for each sub-action:
processing (i) the current observation and (ii) sampled action values for any sub-actions before the particular sub-action in the ordering using a proposal neural network having a plurality of proposal network parameters, wherein the proposal neural network is configured to process (i) the current observation and (ii) the sampled action values in accordance with current values of the proposal network parameters to generate a proposal output for the sub-action that defines a sub-action probability distribution over a set of possible action values for the sub-action, and
sampling the action value for the proposal action from the sub-action probability distribution for the sub-action;
processing the current observation and each sampled random and proposal action using a Q neural network having a plurality of Q network parameters, wherein, for each sampled action, the Q neural network is configured to process the current observation and the sampled action in accordance with current values of the Q network parameters to generate a Q value for the sampled action that is an estimate of a return that would be received if the agent performed the sampled action in response to the current observation;

selecting an action using the Q values generated by the Q neural network for the sampled actions; and causing the agent to perform the selected action.

13. The system of claim 12, wherein selecting an action using the Q values generated by the Q neural network comprises:

selecting the sampled action that has the highest Q value.

14. The system of claim 12, wherein selecting an action from the sampled actions using the Q values generated by the Q neural network comprises:

selecting the sampled action that has the highest Q value with probability $\varepsilon$; and selecting a random action from the set of possible actions with probability $1-\varepsilon$.

15. The system of claim 12, wherein the operations further comprise:

determining a gradient of a proposal loss function with respect to the proposal network parameters, wherein the proposal loss function includes a first term that encourages the probability assigned to the sampled action having the highest Q value to be increased in the proposal probability distribution for the sampled action having the highest Q value; and determining, from the gradient of the proposal loss function, an update to the current values of the proposal network parameters.

16. The system of claim 15, wherein the first term is a negative log likelihood for the proposal probability distribution with the sampled action having the highest Q value as a target.

17. The system of claim 15, wherein the proposal loss function includes a second term that encourages uncertainty in the proposal probability distribution.

18. The system of claim 17, wherein the second term is a negative entropy of the proposal probability distribution.

19. The system of claim 12, wherein the proposal neural network and the Q neural network share some parameters.

20. The system of claim 12, wherein the set of possible action values for the sub-action is discrete, and wherein the proposal output includes a respective probability for each action value in the set of possible action values.

21. The system of claim 12, wherein the set of possible action values for the sub-action is a continuous set of action values selected from a range of action values, and wherein the proposal output includes a respective probability for each choice in a discrete set of choices representing uniformly-spaced values from the range.

22. The system of claim 12, wherein the set of possible action values for the sub-action is a continuous set of action values, and wherein the proposal output includes distribution parameters that define the proposal probability distribution over the continuous set of action values.

23. One or more non-transitory computer storage media storing instructions that when executed by one or more computers cause the one or more computers to perform operations comprising:

receiving a current observation characterizing a current state of an environment being interacted with by an agent;

sampling a plurality of actions from a set of possible actions that can be performed by the agent to interact with the environment, and wherein each action in the set of possible actions comprises a respective action value for each of a plurality of sub-actions, the sampling comprising:

sampling one or more random actions randomly from the set of possible actions;

sampling one or more proposal actions, comprising, for each proposal action:

sampling action values for the proposal action autoregressively one after the other according to an ordering of the sub-actions, comprising, for each sub-action:

processing (i) the current observation and (ii) sampled action values for any sub-actions before the particular sub-action in the ordering using a proposal neural network having a plurality of proposal network parameters, wherein the proposal neural network is configured to process (i) the current observation and (ii) the sampled action values in accordance with current values of the proposal network parameters to generate a proposal output for the sub-action that defines a sub-action probability distribution over a set of possible action values for the sub-action, and sampling the action value for the proposal action from the sub-action probability distribution for the sub-action;

processing the current observation and each sampled random and proposal action using a Q neural network having a plurality of Q network parameters, wherein, for each sampled action, the Q neural network is configured to process the current observation and the sampled action in accordance with current values of the Q network parameters to generate a Q value for the sampled action that is an estimate of a return that would be received if the agent performed the sampled action in response to the current observation;

selecting an action using the Q values generated by the Q neural network for the sampled actions; and causing the agent to perform the selected action.

24. The non-transitory computer storage media of claim 23, wherein selecting an action using the Q values generated by the Q neural network comprises:

selecting the sampled action that has the highest Q value.

25. The non-transitory computer storage media of claim 23, wherein selecting an action from the sampled actions using the Q values generated by the Q neural network comprises:

selecting the sampled action that has the highest Q value with probability $\varepsilon$; and selecting a random action from the set of possible actions with probability $1-\varepsilon$.

26. The non-transitory computer storage media of claim 23, wherein the operations further comprise:

determining a gradient of a proposal loss function with respect to the proposal network parameters, wherein the proposal loss function includes a first term that encourages the probability assigned to the sampled action having the highest Q value to be increased in the proposal probability distribution for the sampled action having the highest Q value; and determining, from the gradient of the proposal loss function, an update to the current values of the proposal network parameters.

27. The non-transitory computer storage media of claim 26, wherein the first term is a negative log likelihood for the proposal probability distribution with the sampled action having the highest Q value as a target.

28. The non-transitory computer storage media of claim 26, wherein the proposal loss function includes a second term that encourages uncertainty in the proposal probability distribution.

29. The non-transitory computer storage media of claim 28, wherein the second term is a negative entropy of the proposal probability distribution.

30. The non-transitory computer storage media of claim 23, wherein the proposal neural network and the Q neural network share some parameters.

31. The non-transitory computer storage media of claim 23, wherein the set of possible action values for the sub-action is discrete, and wherein the proposal output includes a respective probability for each action value in the set of possible action values.

32. The non-transitory computer storage media of claim 23, wherein the set of possible action values for the sub-action is a continuous set of action values selected from a range of action values, and wherein the proposal output includes a respective probability for each choice in a discrete set of choices representing uniformly-spaced values from the range.

33. The non-transitory computer storage media of claim 23, wherein the set of possible action values for the sub-action is a continuous set of action values, and wherein the proposal output includes distribution parameters that define the proposal probability distribution over the continuous set of action values.

* * * * *